(12) United States Patent
Byun et al.

(10) Patent No.: US 10,993,083 B2
(45) Date of Patent: Apr. 27, 2021

(54) METHOD AND APPARATUS FOR NOTIFYING INFORMATION ABOUT MBMS NETWORK

(71) Applicant: LG ELECTRONICS INC., Seoul (KR)

(72) Inventors: Daewook Byun, Seoul (KR); Jian Xu, Seoul (KR); Laeyoung Kim, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 340 days.

(21) Appl. No.: 16/090,575

(22) PCT Filed: Apr. 3, 2017

(86) PCT No.: PCT/KR2017/003622
§ 371 (c)(1),
(2) Date: Oct. 1, 2018

(87) PCT Pub. No.: WO2017/171515
PCT Pub. Date: Oct. 5, 2017

(65) Prior Publication Data
US 2020/0404456 A1    Dec. 24, 2020

Related U.S. Application Data

(60) Provisional application No. 62/317,490, filed on Apr. 1, 2016.

(51) Int. Cl.
*H04W 4/06*      (2009.01)
*H04W 4/40*      (2018.01)
(Continued)

(52) U.S. Cl.
CPC ............... *H04W 4/06* (2013.01); *H04W 4/40* (2018.02); *H04W 88/08* (2013.01); *H04W 92/20* (2013.01)

(58) Field of Classification Search
CPC ......... H04W 4/06; H04W 4/40; H04W 88/08; H04W 92/20
(Continued)

(56) References Cited

U.S. PATENT DOCUMENTS

2005/0170842 A1*   8/2005   Chen ............... H04L 12/185
                                                                     455/454
2005/0213541 A1*   9/2005   Jung ................ H04W 36/0007
                                                                       370/331
(Continued)

OTHER PUBLICATIONS

3GPP TS 36.423 V13.3.0, (Mar. 2016); 3GPP; TSG RAN; E-UTRAN; X2 Application Protocol (X2AP) (Release 13), Mar. 19, 2016, (Year: 2016).*
(Continued)

*Primary Examiner* — Farid Seyedvosoghi
(74) *Attorney, Agent, or Firm* — Lee Hong Degerman Kang Waimey

(57) ABSTRACT

Provided are a method for performing, by a first base station belonging to a first MBMS network, vehicle to everything communication (V2X communication) in a wireless communication system, and an apparatus for supporting the same. The method may comprise the steps of: transmitting information about the first MBMS network to a second base station
(Continued)

station belonging to a second MBMS network; and receiving, from the second base station, information about the second MBMS network.

11 Claims, 13 Drawing Sheets

(51) Int. Cl.
*H04W 92/20* (2009.01)
*H04W 88/08* (2009.01)

(58) Field of Classification Search
USPC ............................................. 370/312
See application file for complete search history.

(56) References Cited

U.S. PATENT DOCUMENTS

| 2013/0242738 | A1 | 9/2013 | Chang | |
|---|---|---|---|---|
| 2015/0119023 | A1* | 4/2015 | Wang | H04W 72/005 455/432.1 |
| 2015/0358940 | A1* | 12/2015 | Zhang | H04W 8/005 370/312 |

OTHER PUBLICATIONS

PCT International Application No. PCT/KR2017/003622, International Search Report dated Jul. 12, 2017, 4 pages.
3rd Generation Partnership Project (3GPP), "Technical Specification Group Services and System Aspects; Study on architecture enhancements for LTE support of V2X services (Release 14)," 3GPP TR 23.785 V0.2.0, Feb. 2016, 23 pages.
3rd Generation Partnership Project (3GPP), "Technical Specification Group Services and System Aspects; Multimedia Broadcast/Multicast Service (MBMS); Architecture and functional description (Release 13)," 3GPP TS 23.246 V13.3.0, Dec. 2015, 68 pages.
3rd Generation Partnership Project (3GPP), "Technical Specification Group Services and System Aspects; Multimedia Broadcast/Multicast Service (MBMS); Protocols and codecs (Release 13)," 3GPP TS 26.346 V13.4.0, Mar. 2016, 236 pages.
3rd Generation Partnership Project (3GPP), "Technical Specification Group Radio Access Network; Evolved Universal Terrestrial Radio Access Network (E-UTRAN); X2 application protocol (X2AP) (Release 13)," 3GPP TS 36.423 V13.3.0, Mar. 2016, 232 pages.

\* cited by examiner (a)

(b)

_(1)_

METHOD AND APPARATUS FOR NOTIFYING INFORMATION ABOUT MBMS NETWORK

CROSS-REFERENCE TO RELATED APPLICATIONS

This application is the National Stage filing under 35 U.S.C. 371 of International Application No. PCT/KR2017/003622, filed on Apr. 3, 2017, which claims the benefit of U.S. Provisional Application No. 62/317,490, filed on Apr. 1, 2016, the contents of which are all hereby incorporated by reference herein in their entirety.

BACKGROUND OF THE INVENTION

Field of the Invention

The present invention relates to a wireless communication system and, more particularly, to a method for notifying a neighboring base station of information about a Multimedia Broadcast Multicast Service (MBMS) network and an apparatus for supporting the method.

Related Art

3rd Generation Partnership Project (3GPP) Long Term Evolution (LTE) that is an advancement of Universal Mobile Telecommunication System (UMTS) is being introduced with 3GPP release 8. In 3GPP LTE, orthogonal frequency division multiple access (OFDMA) is used for downlink, and single carrier-frequency division multiple access (SC-FDMA) is used for uplink. The 3GPP LTE adopts multiple input multiple output (MIMO) having maximum four antennas. Recently, a discussion of 3GPP LTE-Advanced (LTE-A) which is the evolution of the 3GPP LTE is in progress.

There is a growing interest in a Device-to-Device (D2D) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D communication.

D2D communication may have various advantages in that it is communication between devices in proximity. For example, D2D UE has a high transfer rate and a low delay and may perform data communication. Furthermore, in D2D communication, traffic concentrated on a base station can be distributed. If D2D UE plays the role of a relay, it may also play the role of extending coverage of a base station.

Vehicle-to-everything (V2X) communication, which adds mobility to the D2D technology, is a technology for a vehicle to continuously exchange and share useful information such as traffic condition with roadside infrastructure or other vehicles.

SUMMARY OF THE INVENTION

Meanwhile, if a UE moves between different MBMS networks, the UE may not receive a V2X message broadcast from the corresponding network until it receives information about the MBMS network (for example, USB) from the corresponding MBMS network. Therefore, a base station belonging to a specific MBMS network needs to know the information about other neighboring MBMS networks.

In one embodiment of the present invention, a method for performing V2X communication by a first base station belonging to a first MBMS network in a wireless communication system is provided. The method may comprise transmitting information about the first MBMS network to a second base station belonging to a second MBMS network; and receiving information about the second MBMS network from the second base station.

The first MBMS network and the second MBMS network may be MBMS networks having different network information. The first MBMS network and the second MBMS network may be local MBMS networks different from each other.

The information about the first MBMS network may include User Service Description (USD) of the first MBMS network, and the information about the second MBMS network may include USD of the second MBMS network. The information about the first MBMS network may be used for MBMS reception of V2X message in the first MBMS network, and the information about the second MBMS network may be used for MBMS reception of V2X message in the second MBMS network.

The information about the first MBMS network may be transmitted to the second base station by being included in an X2 setup request message, and the information about the second MBMS network may be received from the second base station by being included in an X2 setup response message.

In another embodiment, a method for performing V2X communication by a first base station belonging to a first MBMS network in a wireless communication system is provided. The method may comprise receiving information about a second MBMS network from a second base station belonging to the second MBMS network; and determining whether information about a second MBMS network received from the second base station matches any one of information about an MBMS network stored in the first base station.

The method may further comprise, if it is determined that information about a second MBMS network received from the second base station does not match the information about an MBMS network stored in the first base station, storing the received information about the second MBMS network.

The method may further comprise, if it is determined that information about the second MBMS network received from the second base station matches any one of the information about an MBMS network stored in the first base station, ignoring the received information about the second MBMS network.

The first MBMS network and the second MBMS network may be MBMS networks having different network information. The first MBMS network and the second MBMS network may be local MBMS networks different from each other.

The information about the second MBMS network may include USD of the second MBMS network.

The method may further comprise transmitting a response about the information about the second MBMS network to the second base station. The information about the second MBMS network is received from the second base station by being included in an eNB configuration update message, and the information about the second MBMS network may be transmitted to the second base station by being included in an eNB configuration update acknowledge message.

In another embodiment, a first base station belonging to a first MBMS network performing V2X communication in a wireless communication system is provided. The first base station may comprise a memory: a transceiver; and a processor connecting the memory and the transceiver, wherein the processor is configured to control the transceiver to transmit information about the first MBMS network to a second base station belonging to a second MBMS network and to control the transceiver to receive information about the second MBMS network from the second base station.

A UE may receive a V2X message seamlessly.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
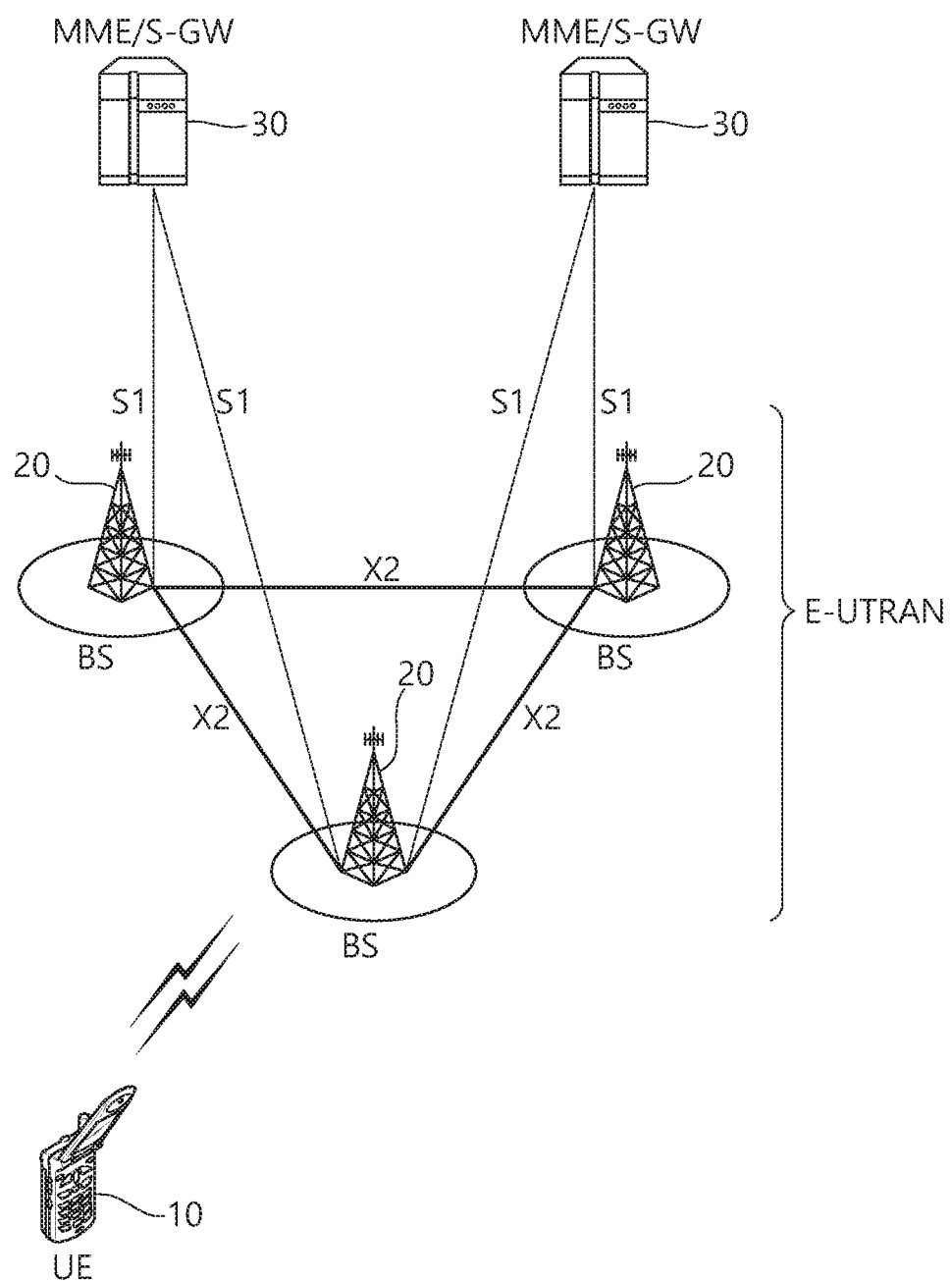
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
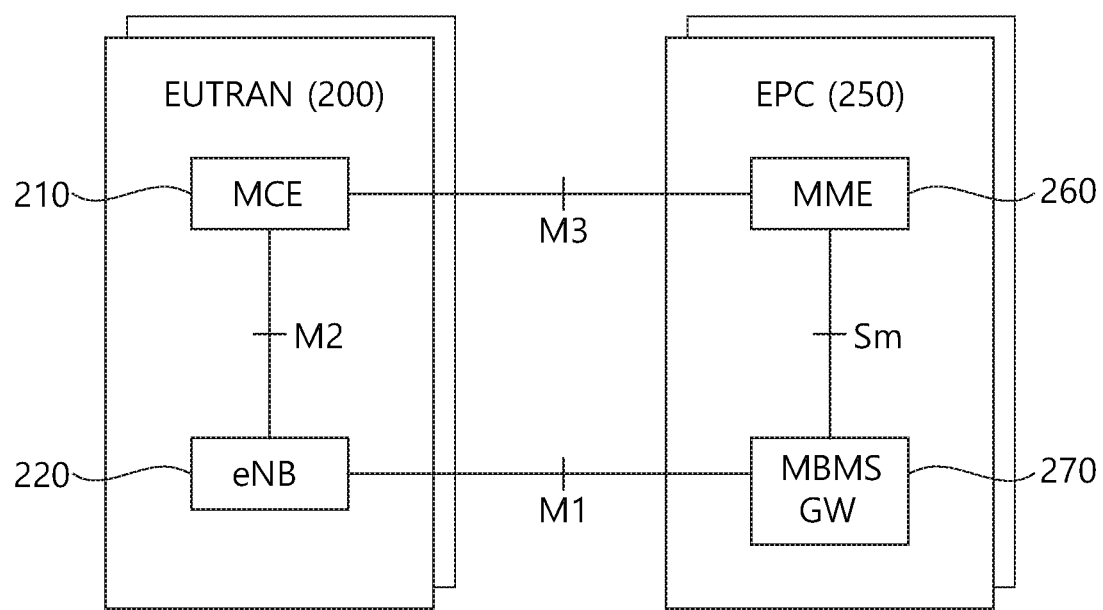
FIG. 2 shows a network architecture for an MBMS.

FIG. 2 shows a network architecture for a Multimedia Broadcast/Multicast Service (MBMS).

Referring to FIG. 2, the radio access network (EUTRAN) 200 includes a multi-cell coordination entity (hereinafter, "MCE") 210 and a base station (eNB) 220. The MCE 210 is a main entity for controlling the MBMS and plays a role to perform session management, radio resource allocation or admission control of the base station 220. The MCE 210 may be implemented in the base station 220 or may be implemented independent from the base station 220. The interface between the MCE 210 and the base station 220 is called M2 interface. The M2 interface is an internal control plane interface of the radio access network 200 and MBMS control information is transmitted through the M2 interface. In case the MCE 210 is implemented in the base station 220, the M2 interface may be present only logically.

The Evolved Packet Core (EPC) 250 includes an MME 260 and an MBMS gateway (GW) 270. The MBMS gateway 270 is an entity for transmitting MBMS service data and is positioned between the base station 220 and the BM-SC and performs MBMS packet transmission and broadcast to the base station 220. The MBMS gateway 270 uses a PDCP and IP multicast to transmit user data to the base station 220 and performs session control signaling for the radio access network 200.

The interface between the MME 260 and the MCE 210 is a control plane interface between the radio access network 200 and the EPC 250 and is called M3 interface. Control information related to MBMS session control is transmitted through the M3 interface. The MME 260 and the MCE 210 transmits, to the base station 220, session control signaling such as a session start/stop message for session start or session stop, and the base station 220 may inform the UE through a cell notification that the corresponding MBMS service has been started or stopped.

The interface between the base station 220 and the MBMS gateway 270 is a user plane interface and is called M1 interface.

Figure 3:
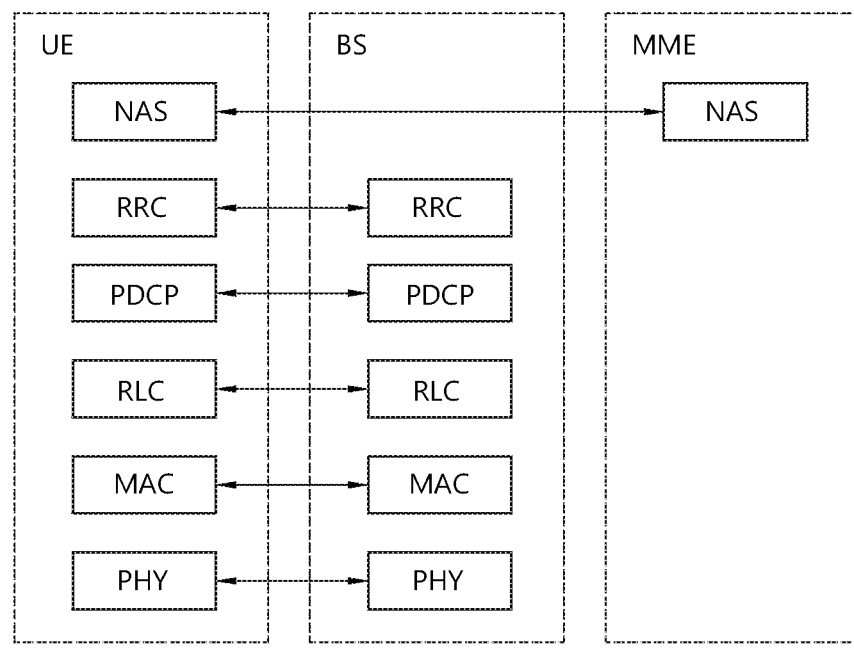
FIG. 3 shows a control plane and a user plane of a radio interface protocol of an LTE system.
Figure 3:
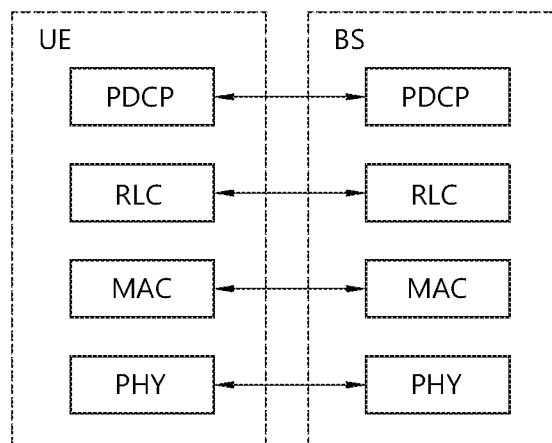

FIG. 3 shows a control plane and a user plane of a radio interface protocol of an LTE system. FIG. 3(a) shows a control plane of a radio interface protocol of an LTE system. FIG. 3(b) shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 3(a), the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3(b), the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC State of a UE and RRC Connection Procedure are Described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Hereinafter, an MBMS and a Multicast/Broadcast Single Frequency Network (MBSFN) are Described.

MBSFN transmission or MBSFN-mode transmission refers to a simultaneous transmission scheme in which a plurality of cells transmits the same signal at the same time. MBSFN transmissions from a plurality of cells within an MBSFN area are perceived as a single transmission for a UE.

The MBMS service may be managed or localized in a cell-based or geography-based manner. An area in which a specific MBMS service is provided is widely referred to as an MBMS service area. For example, if an area in which a specific MBSMS service A proceeds is an MBMS service area A, a network in the MBMS service area A may be in a state of transmitting the MBMS service A. In this case, the UE may receive the MBMS service A according to a UE capability. The MBMS service area may be defined in terms of an application and a service as to whether a specific service is provided in a specific area.

A transport channel for the MBMS, that is, a multicast channel (MCH), may be mapped to a logical channel, e.g., a multicast control channel (MCCH) or a multicast traffic channel (MTCH). The MCCH transmits an MBMS-related RRC message, and the MTCH transmits a traffic of a specific MBMS service. One MCCH exists in every one MBMS single frequency network (MBSFN) region for transmitting the same MBMS information/traffic. The MCCH includes one MBSFN region configuration RRC message, and has a list of all MBMS services. If the MBMS-related RRC message is changed in a specific MCCH, a physical downlink control channel (PDCCH) transmits an MBMS radio network temporary identity (M-RNTI) and an indication for indicating the specific MCCH. The UE which supports the MBMS may receive the M-RNTI and the MCCH indication through the PDCCH, may recognize that the MBMS-related RRC message is changed in the specific MCCH, and may receive the specific MCCH. The RRC message of the MCCH may be changed in every modification period, and is broadcast repetitively in every repetition period. A notification mechanism is used to inform an MCCH change caused by a presence of an MCCH session start or MBMS counting request message. The UE detects the MCCH change informed without having to depend on the notification mechanism through MCCH monitoring in the modification period. The MTCH is a logical channel on which an MBMS service carried. If many services are provided in an MBSFN region, a plurality of MTCHs may be configured.

A UE may also be provided with a dedicated service while being provided with an MBMS service. For example, a user may chat on the user's own smartphone using an instant messaging (IM) service, such as MSN or Skype, simultaneously with watching a TV on the smartphone through an MBMS service. In this case, the MBMS service is provided through an MTCH received by a plurality of UEs at the same time, while a service provided for each individual UE, such as the IM service, is provided through a dedicated bearer, such as a dedicated control channel (DCCH) or dedicated traffic channel (DTCH).

In one area, a BS may use a plurality of frequencies at the same time. In this case, in order to efficiently use radio resources, a network may select one of the frequencies to provide an MBMS service only in the frequency and may provide a dedicated bearer for each UE in all frequencies. In this case, when a UE, which has been provided with a service using a dedicated bearer in a frequency where no MBMS service is provided, wishes to be provided with an MBMS service, the UE needs to be handed over to an MBMS providing frequency. To this end, the UE transmits an MBMS interest indication to a BS. That is, when the UE wishes to receive an MBMS service, the UE transmits an MBMS interest indication to the BS. When the BS receives the indication, the BS recognizes that the UE wishes to receive the MBMS service and hands the UE over to an MBMS providing frequency. Here, the MBMS interest indication is information indicating that the UE wishes to receive an MBMS service, which additionally includes information on a frequency to which the UE wishes to be handed over.

The UE, which wishes to receive a specific MBMS service, first identifies information on a frequency at which the specific service is provided and information on broadcast time at which the specific service is provided. When the MBMS service is already on air or is about to be on air, the UE assigns the highest priority to the frequency at which the MBMS service is provided. The UE performs a cell reselection procedure using reset frequency priority information and moves to a cell providing the MBMS service to receive the MBMS service.

When the UE is receiving an MBMS service or is interested in receiving an MBMS service and when the UE is allowed to receive an MBMS service while camping on an MBMS service-providing frequency, it may be considered that the frequency is assigned the highest priority during an MBMS session as long as the following situations last while the reselected cell is broadcasting SIB13.

When SIB15 of a serving cell indicates that one or more MBMS service area identities (SAIs) are included in the user service description (USD) of the service.

SIB15 is not broadcast in a serving cell, and the frequency is included in the USD of the service.

A UE needs to be able to receive an MBMS in RRC_IDLE and RRC_CONNECTED states.

In What Follows, User Service Description (USD) Will be Described.

The application/service layer may transmit User Service Description (USD) to the UE by including a Temporary Mobile Group Identity (TMGI) for each MBMS service, session start and end time, frequency, and information about MBMS service area identities (SAIs) belonging to the MBMS service region.

As a mechanism for notifying of the USD, SMS cell broadcast to advertise MBMS multicast and broadcast user services, MBMS broadcast mode to advertise MBMS multicast and broadcast user services, MBMS multicast mode to advertise MBMS multicast user services, push mechanism (for example, WAP, SMS-PP, and MMS), or URL (for example, HTTP or FTP) may be taken into account.

The 3GPP TS 26.346 V13.4.0 (2016 March) and the 3GPP TS 23.246 V13.3.0 (2015 December) may be consulted for more specific content about the USD.

Hereinafter, a D2D Operation Will be Described.

In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described. The ProSe includes ProSe direct communication and ProSe direct discovery.

The ProSe direct communication presents communication performed by two or more adjacent UEs. The UEs may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a UE which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable UEs are closed to each other, and reports the close state thereof the two ProSe enabled UEs. Hereinafter, the ProSe direct communication may refer to D2D communication, and the ProSe direct discovery may refer to D2D discovery.

Hereinafter, Radio Resource Assignment for ProSe Direct Communication is Described.

A ProSe enable UE may use following two modes with respect to resource assignments for the ProSe direct communication.

1) Mode 1: The mode 1 is a mode for receiving scheduling a resource for the ProSe direct communication from a base station. The UE should be in a RRC_CONNECTED state according to the mode 1 in order to transmit data. The UE requests a transmission resource to the base station, and the base station schedules a resource for scheduling assignment and data transmission. The UE may transmit a scheduling request to the base station and may transmit a Buffer Status Report (ProSe BSR). The base station has data which the UE will perform the ProSe direct communication and determines whether a resource for transmitting the data is required.

2) Mode 2: The mode 2 is a mode for selecting a direct resource. The UE directly selects a resource for the ProSe direct communication from a resource pool. The resource pool may be configured by a network or may be previously determined.

Meanwhile, when the UE includes a serving cell, that is, when the UE is in an RRC_CONNECTED state with the base station or is located in a specific cell in an RRC_IDLE state, the UE is regarded to be in coverage of the base station. If the UE is located outside of the coverage, only the mode 2 is applicable. If the UE is located in the coverage, the mode 1 or the mode 2 may be used according to setting of the base station. If there are no exceptional conditions, only when the base station is configured, the UE may change a mode from the mode 1 to the mode 2 or from the mode 2 to the mode 1.

Figure 4:
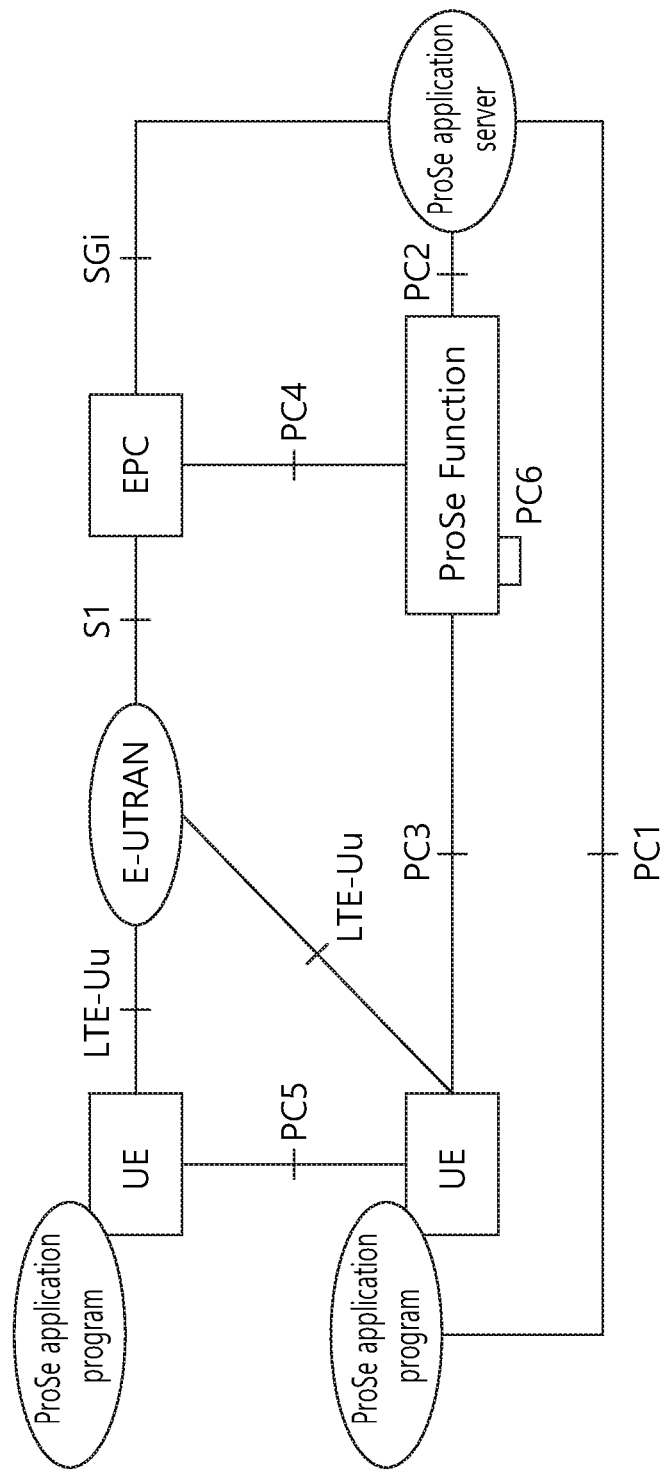
FIG. 4 illustrates a reference structure for ProSe.

FIG. 4 shows a reference structure for a ProSe.

Referring to FIG. 4, the reference structure for a ProSe includes a plurality of UEs having E-UTRAN, EPC, and ProSe application program, a ProSe application (APP) server, and a ProSe function. An EPC is a representative example of the E-UTRAN. The EPC may include an MME, an S-GW, a P-GW, a policy and charging rules function (PCRF), and a home subscriber server (HSS). The ProSe application server is a user of ProSe in order to make an application function. The ProSe application server may communicate with an application program in the UE. The application program in the UE may use a ProSe ability to make an application function.

The ProSe function may include at least one of following functions but is not limited thereto.

Interworking via a reference point towards the 3rd party applications
Authorization and configuration of the UE for discovery and direct communication)
Enable the function of the EPC level ProSe discovery
ProSe related new subscriber data and handling of data storage, and also handling of ProSe identities
Security related function
Provide control towards the EPC for policy related function
Provide function for charging (via or outside of EPC, e.g., offline charging))

Hereinafter, a Reference Point and a Reference Interface Will be Described in a Reference Structure for the ProSe.

PC1: a reference point between a ProSe application program in the UE and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the UE and the ProSe function. The PC3 is used to define an interaction between the UE and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between UEs, and 1:1 communication.

PC6: is a reference point to use a function such as ProSe discovery between users included in different PLMNs.

SGi: may be used for application data and application level control information exchange.

Hereinafter, ProSe Direct Communication (D2D Communication) is described.

The ProSe direct communication is a communication mode where two public safety UEs may perform direct communication through a PC 5 interface. The communication mode may be supported in both of a case of receiving a service in coverage of E-UTRAN or a case of separating the coverage of E-UTRAN.

Hereinafter, Vehicle to Everything (V2X) Communication is Described.

Figure 5:
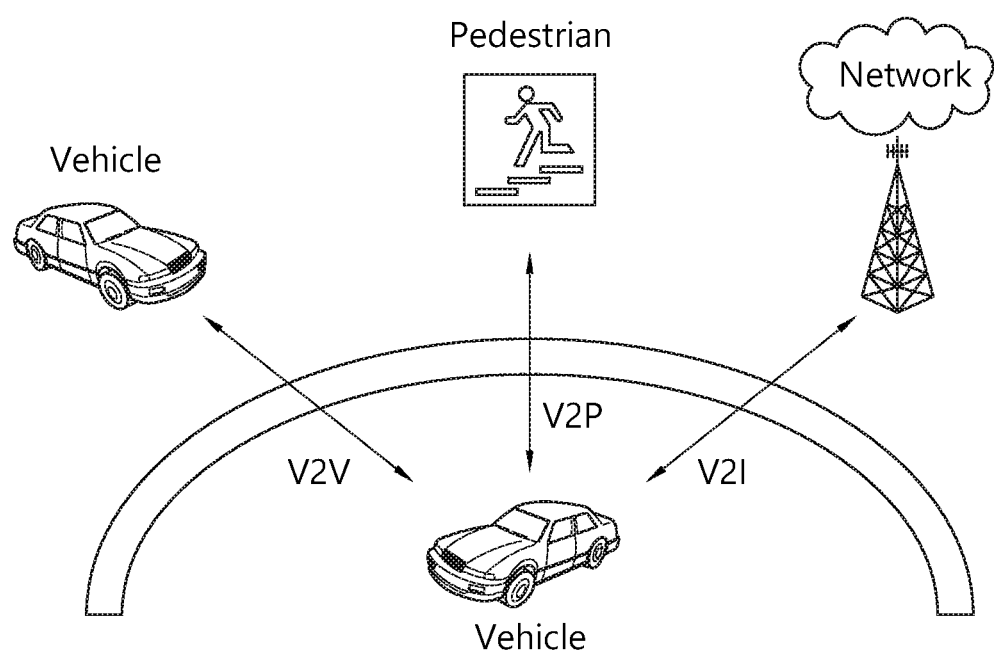
FIG. 5 illustrates a V2X communication environment.

FIG. 5 is a diagram illustrating a V2X communication environment.

V2X is a technology that continuously communicates with a road infra or another vehicle while running a vehicle by adding mobility to D2D technology to exchange and share valuable information such as traffic situation. Researches and studies for supporting Vehicle-to-Vehicle (V2V) communication, Vehicle-to-Infrastructure (V2I) communication, Vehicle-to-Pedestrian (V2P) communication, Vehicle-to-Network (V2N) communication through evolution of connectivity function has been performed.

According to V2X communication, a vehicle continuously broadcasts a position, speed, and a direction of the vehicle. Peripheral vehicles receiving the broadcasted information recognize movement of peripheral vehicles to use accident prevention. That is, similar to a case where a person has a UE in the form of a smart phone or a smart watch, a UE of a specific form may be installed in each vehicle. In this case, a UE installed at a vehicle is a device for receiving a real communication service from a communication network. For example, the UE installed at the vehicle may access a base station in an E-UTRAN to receive a communication service.

Meanwhile, before describing a suggested V2X, a plurality of terms to be used in the specification is firstly defined.

RSU (Road Side Unit): The RSU is an entity for supporting V2I communication, and means an entity capable of performing transmission and reception to and from a UE using a V2I application. The RSU may be configured by a base station or a UE (particularly, stationary UE). The base station or the UE operating as the RSU collects information (e.g., traffic light information, traffic volume information, and the like) on traffic safety and/or information on movement of peripheral vehicles, and transmits information to other UEs being a communication target or receives information from other UEs.

V2I communication: V2I communication is a type of V2X communication. A UE and an RSU using the V2I application becomes a subject of the V2I communication.

V2N communication: V2N communication is a type of V2X communication. A UE and a serving entity using a V2N application becomes a subject of the V2N communication, and the UE and the serving entity communicate with each other through an LTE network entity.

V2P communication: V2P communication is a type of V2X communication. Two UE using a V2P application become a subject of the V2P communication.

V2V communication: V2V communication is a type of V2X communication. Two UE using a V2V application become a subject of the V2V communication. The difference of V2V communication from V2P communication is in that one UE becomes a UE of a pedestrian in the V2P communication, and one UE becomes a UE of a vehicle in the V2V communication.

Un interface: The Un interface means an interface between a relay node and a base station, which is an interface used in transmission/reception achieved in MBSFN (MBMS (Multimedia Broadcast/Multicast Services) over Single Frequency Network) sub-frame.

PC5 interface: The PC5 interface means an interface used in direct communication between two UEs, which is an interface used for communication between devices for supporting a Proximity Service (ProSE).

In What Follows, a Localized MBMS Will be Described.

In the current MBMS system, the BM-SC, MBMS-GW, and MME may be located in the core network. The backhaul delay between the BM-SC and the base station is non-negligible when the end-to-end delay is calculated, especially when MBMS is used to deliver downlink V2X packets in the V2X system. To minimize the latency, it may be necessary to consider the following options.

First option: The MBMS CN function (for example, BM-SC or MBMS-GW) is moved close to the base station or collocated in the base station.

Second option: The user plane of the MBMS CN function (for example, BM-SC or MBMS-GW) is moved close to the base station or collocated in the base station.

To minimize the V2X delay, various disposition options may be considered.

Figure 6:
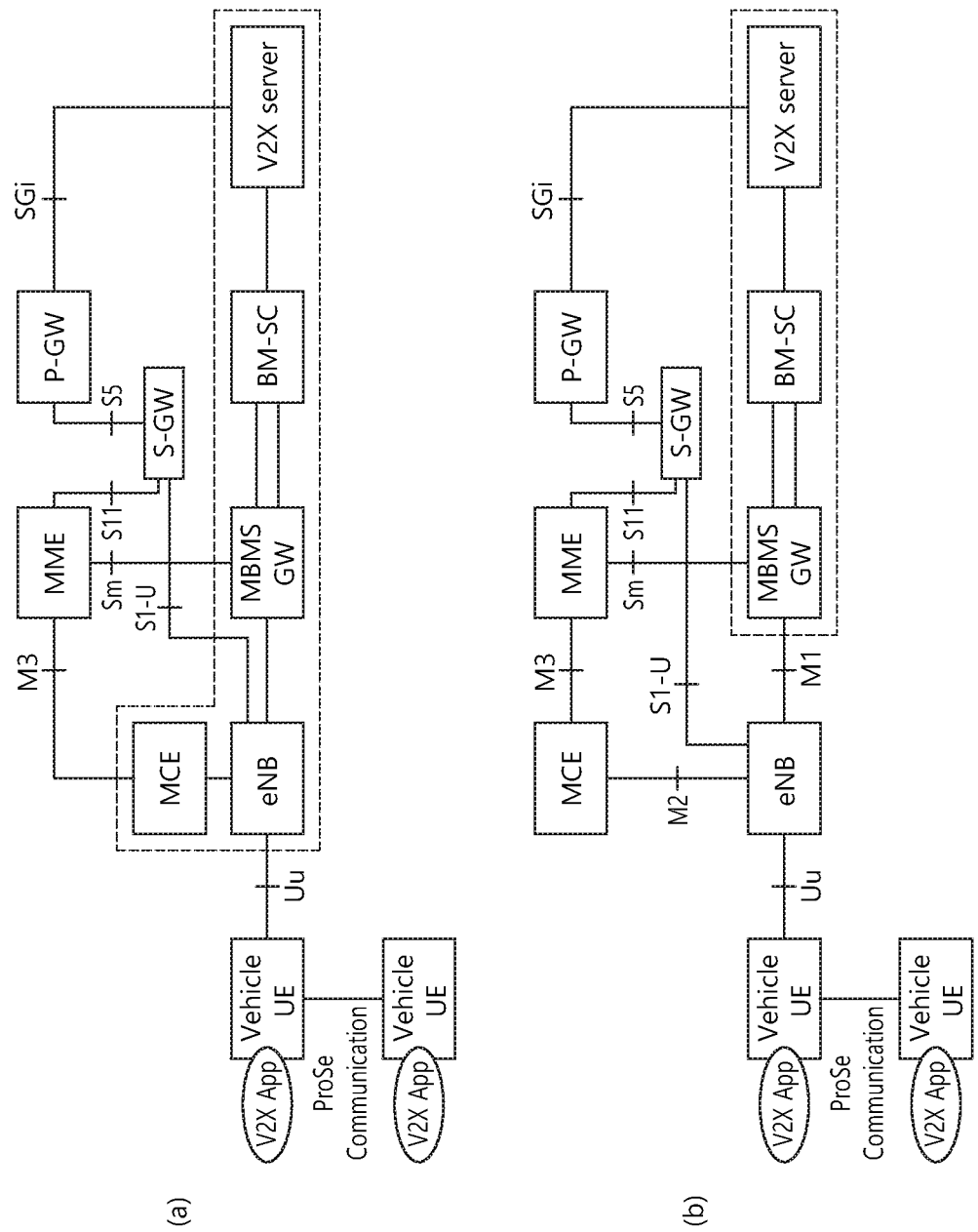
FIG. 6 illustrates a localized V2X server and an MBMS.

FIG. 6 illustrates a localized V2X server and an MBMS. More specifically, FIG. 6(a) illustrates a localized V2X server and MBMS, co-located with the base station; and FIG. 6(b) illustrates a localized V2X server and MBMS, not co-located with the base station.

Referring to FIG. 6(a), the V2X server, BM-SC, and MBMS GW may all be co-located in the base station. Since all of the user plane interfaces exist in inside, it is possible to minimize the V2X delay. Referring to FIG. 6(b), although the V2X server, BM-SC, and MBMS GW are all co-located, they may not be co-located with the base station. This physical node may deliver V2X traffic to various base stations.

Figure 7:
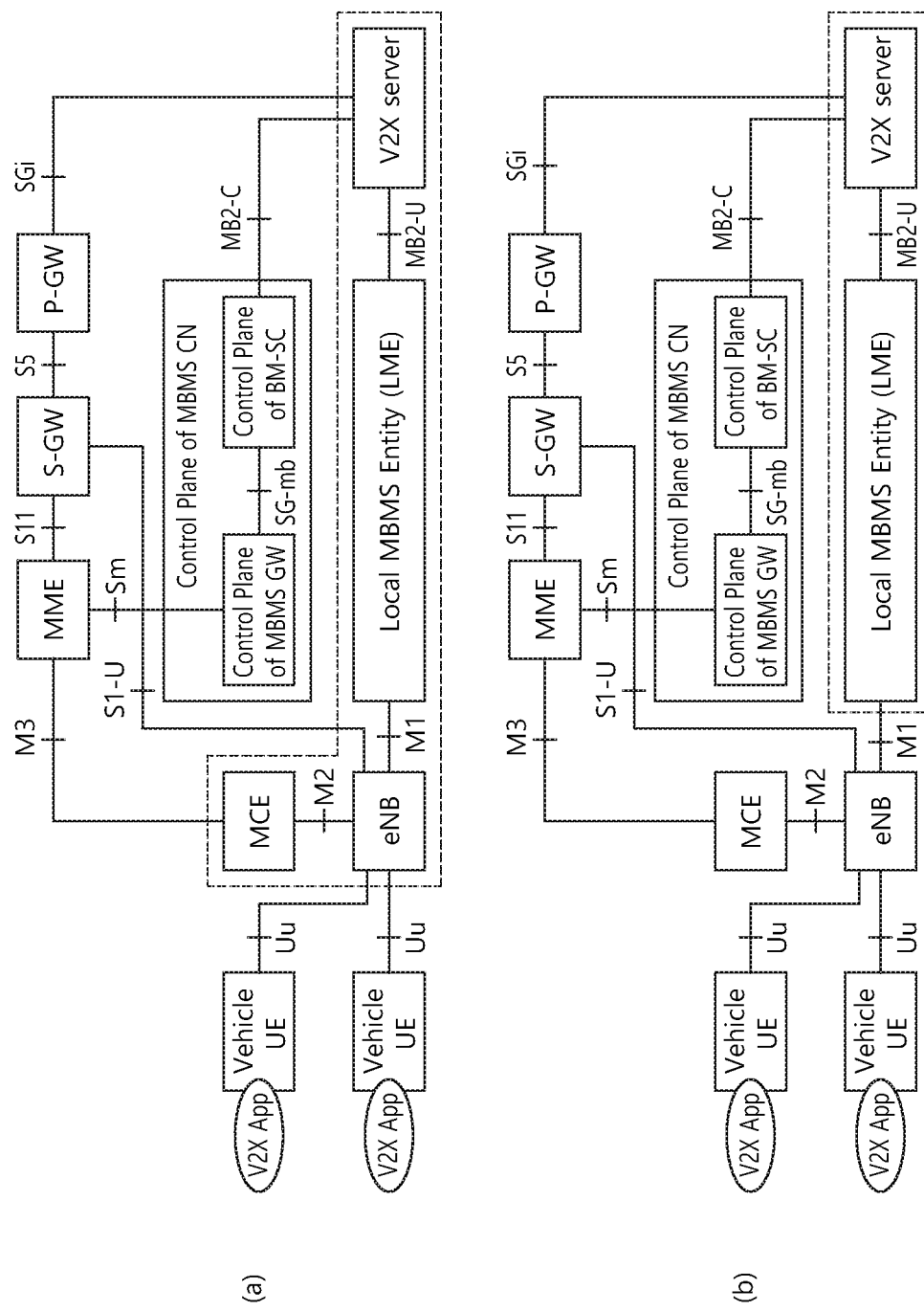
FIG. 7 illustrates a localized V2X server and a local MBMS entity (LME).

FIG. 7 illustrates a localized V2X server and a local MBMS entity (LME). More specifically, FIG. 7(a) illustrates a localized V2X server and an LME, co-located with the base station; and FIG. 7(b) illustrates a localized V2X server and an LME, not co-located with the base station.

Referring to FIG. 7(a), the V2X server and the LME which include the user plane of the MBMS CN function may all be co-located in the base station. A V2X message may be delivered may be delivered from the cell serviced by a hosting base station. Since all of the user plane interfaces exist in inside, it is possible to minimize the V2X delay. Referring to FIG. 7(b), although the V2X server and the LME including the user plane of the MBMS CN function are all co-located, they may not be co-located with the base station. A V2X message may be delivered from a cell serviced by several base stations.

If the MBMS CN function (for example, the BM-SC or the MBMS GW) moves close to the base station, the number of base stations that may be covered by the MBMS CN function may be decreased. For example, in the case of a local MBMS network in which the MBMS CN function is located close to the base station, the number of base stations that may be covered by the MBMS CN function may be smaller than the case of an ordinary MBMS network.

Figure 8:
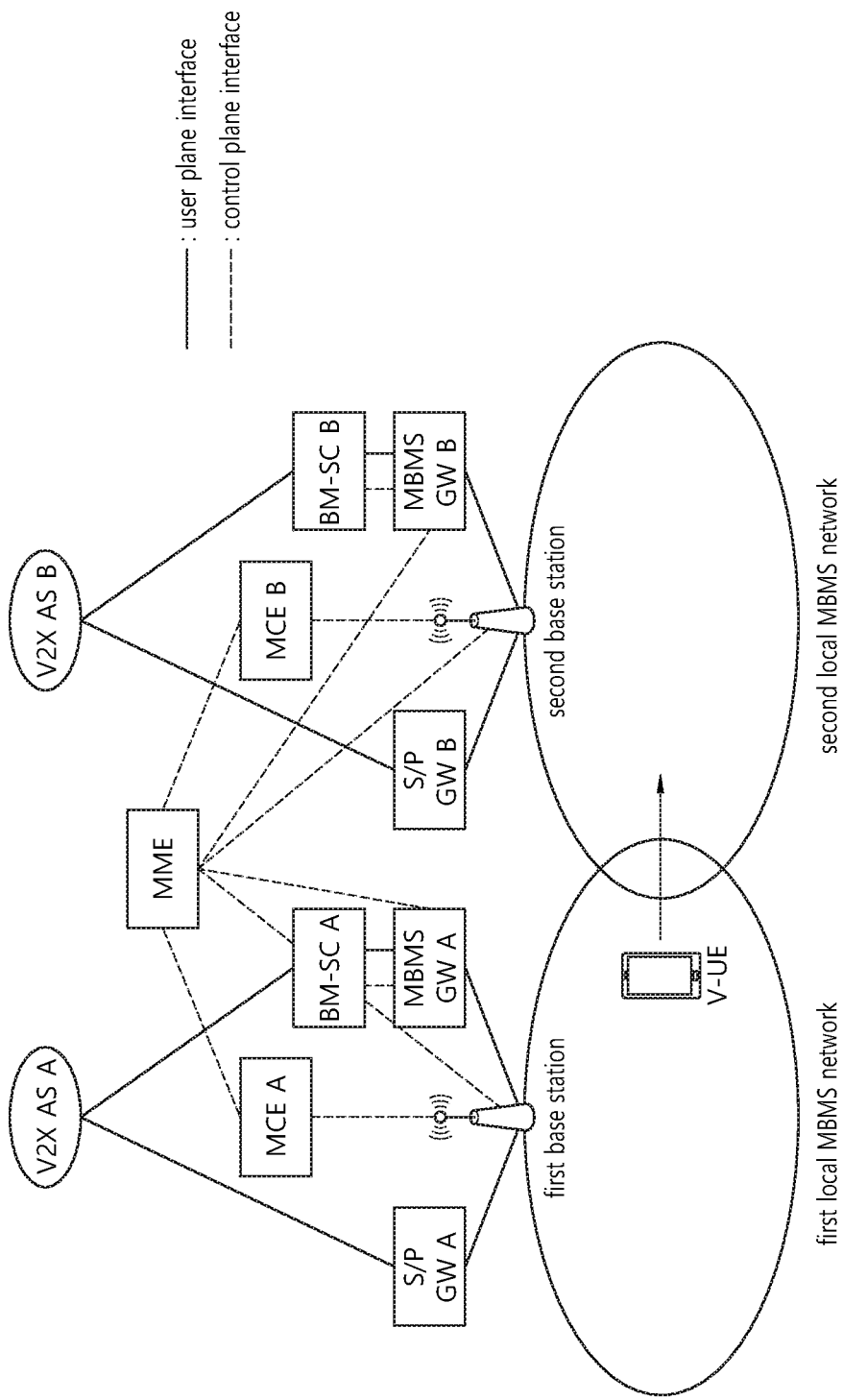
FIG. 8 illustrates a problem that occurs when a UE moves between different local MBMS networks.

FIG. 8 illustrates a problem that occurs when a UE moves between different local MBMS networks.

Referring to FIG. 8, it is assumed that the first MBMS network and the second MBMS network are local MBMS networks having different network information. For example, the USD held by the first local MBMS network may be different from the USD held by the second local MBMS network. In this case, if a UE in the first local MBMS network moves to the second local MBMS network, the UE may not be able to receive a V2X message broadcast by the second local MBMS network until the UE becomes ready to receive the V2X message by receiving information for MBMS reception of the V2X message. This is so because the MBMS-related information provided by the first local MBMS network is different from the MBMS-related information provided by the second local MBMS network. For example, since the USD provided by the first local MBMS network differs from the USD provided by the second local MBMS network, the UE which has moved to the second local MBMS network may not be able to receive a V2X message broadcast by the second local MBMS network until the UE receive USD information from the second local MBMS network. For the purpose of clarification, it is assumed that the UE moves to a different local network in a local MBMS network scenario; however, the same problem may occur for the case where the UE moves to a network having different MBMS-related information in an ordinary MBMS network scenario.

In what follows, a method for a base station to notify a neighboring base station of information about an MBMS network and an apparatus supporting the method according to one embodiment of the present invention will be described.

The base station may provide information about the MBMS network to a neighboring base station. The information about the network may include User Service Description (USD) of the MBMS network. The USD may include Temporary Mobile Group Identity (TMGI) for each MBMS service, session start and end time, frequency, and information about MBMS service area identities (SAIs) belonging to the MBMS service region. The base station and the neighboring base station may have an X2 connection between them.

The base station and the neighboring base station may belong to different MBMS networks. The base station and the neighboring base station may have information about different MBMS networks. For example, while the base station belongs to the first MBMS network, the neighboring base station may belong to the second MBMS network. For example, while the base station belongs to the first local MBMS network, the neighboring base station may belong to the second local MBMS network. For example, the base station and the neighboring base station may receive different USDs from the respective MBMS networks.

Figure 9:
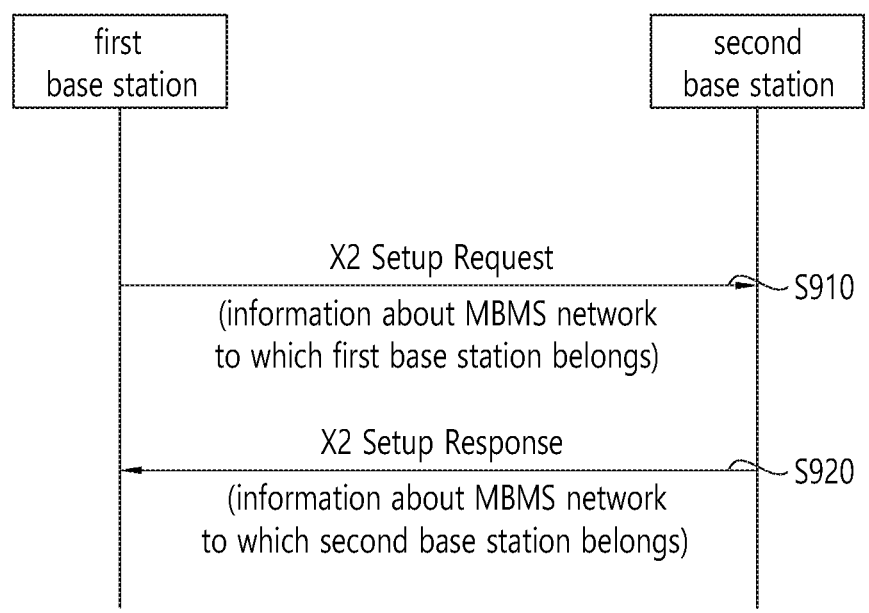
FIG. 9 illustrates a method for a base station to notify of information about an MBMS network by a base station through an X2 setup procedure according to one embodiment of the present invention.

FIG. 9 illustrates a method for a base station to notify of information about an MBMS network through an X2 setup procedure according to one embodiment of the present invention.

Referring to FIG. 9, at the S910 step, the first base station may transmit information about an MBMS network to the second base station. The information about the MBMS network may be transmitted to the second base station by using an X2 setup request message. Alternatively, the information about the MBMS network may be transmitted to the second base station by using a new message.

The information about the MBMS network may be the information about the MBMS network to which the first base station belongs. The information about the MBMS network may include the USD of the MBMS network to which the first base station belongs. The information about the MBMS network may be the information used for MBMS reception of V2X message in the MBMS network to which the first base station belongs. The MBMS network may be a local MBMS network. For example, the X2 setup request message may be defined as shown in Table 1 below.

TABLE 1

| IE/Group Name | Presence | Semantics description | Criticality |
| --- | --- | --- | --- |
| Message Type | M | | YES |
| Global eNB ID | M | | YES |
| Served Cells | | Complete list of cells served by the eNB | YES |
| >Served Cell Information | M | | — |
| >Neighbour Information | | | — |
| >>ECGI | M | E-UTRAN Cell Global Identifier of the neighbour cell | — |
| >>PCI | M | Physical Cell Identifier of the neighbour cell | — |
| >>EARFCN | M | DL EARFCN for FDD or EARFCN for TDD | — |
| >>TAC | O | Tracking Area Code | YES |
| >>EARFCN Extension | O | DL EARFCN for FDD or EARFCN for TDD. If this IE is present, the value signalled in the EARFCN IE is ignored. | YES |
| GU Group Id List | | List of all the pools to which the eNB belongs | GLOBAL |
| >GU Group Id | M | | — |
| LHN ID | O | | YES |
| User Service Description | | | — |

At the S920 step, if the second base station receives information about an MBMS network from the first base station, the second base station may store the received information about the MBMS network. And the second base station may transmit the information about the MBMS network to the first base station. The information about the MBMS network may be transmitted to the first base station by using an X2 setup response message. Alternatively, the information about the MBMS network may be transmitted to the second base station by using a new message.

The information about the MBMS network may be the information about the MBMS network to which the second base station belongs. The information about the MBMS network may include the USD of the MBMS network to which the second base station belongs. The information about the MBMS network may be the information used for MBMS reception of V2X message in the MBMS network to which the second base station belongs. The MBMS network may be a local MBMS network. For example, the X2 setup request message may be defined as shown in Table 2 below.

TABLE 2

| IE/Group Name | Presence | Semantics description | Criticality |
|---|---|---|---|
| Message Type | M | | YES |
| Global eNB ID | M | | YES |
| Served Cells | | Complete list of cells served by the eNB | GLOBAL |
| >Served Cell Information | M | | — |
| >Neighbour Information | | | — |
| >>ECGI | M | E-UTRAN Cell Global Identifier of the neighbour cell | — |
| >>PCI | M | Physical Cell Identifier of the neighbour cell | — |
| >>EARFCN | M | DL EARFCN for FDD or EARFCN for TDD | — |
| >>TAC | O | Tracking Area Code | YES |
| >>EARFCN Extension | O | DL EARFCN for FDD or EARFCN for TDD. If this IE is present, the value signalled in the EARFCN IE is ignored. | YES |
| GU Group Id List | | List of all the pools to which the eNB belongs | GLOBAL |
| >GU Group Id | M | | — |
| Criticality Diagnostics | O | | YES |
| LHN ID | O | | YES |
| User Service Description | | | |

According to the proposed procedure, a base station and its neighboring base station may exchange information about the MBMS network. In other work, the base station may know the information about the MBMS network to which the neighboring base station belongs, and the neighboring base station may know the information about the MBMS network to which the base station belongs. Therefore, even if the UE moves from a current MBMS network to a different MBMS network, the UE may receive the V2X message broadcast by the different MBMS network without a delay.

Figure 10:
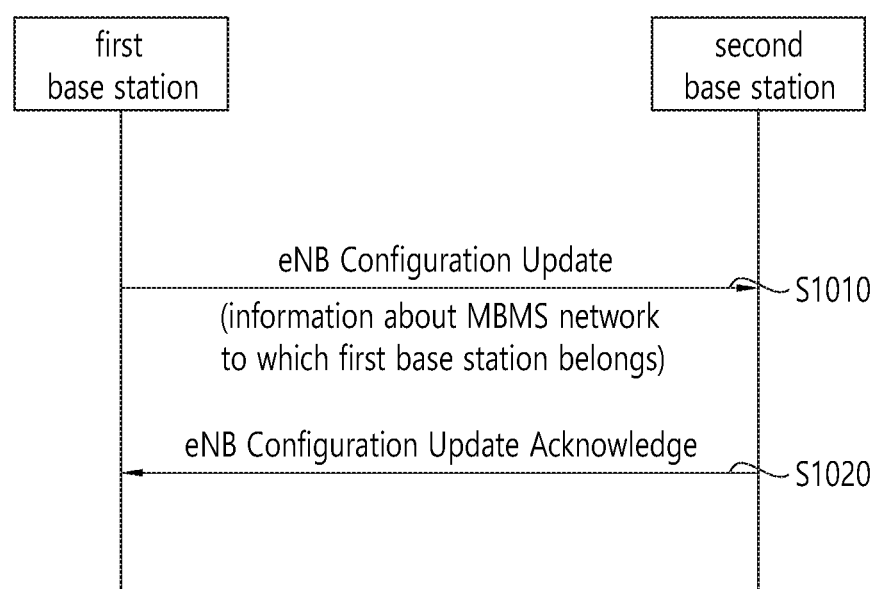
FIG. 10 illustrates a method for a base station to notify of information about an MBMS network through an eNB configuration update procedure according to one embodiment of the present invention.

FIG. 10 illustrates a method for a base station to notify of information about an MBMS network through an eNB configuration update procedure according to one embodiment of the present invention.

Referring to FIG. 10, at the S1010 step, the first base station may transmit information about an MBMS network. The information about the MBMS network may be transmitted to the second base station by using an eNB configuration update message. Alternatively, the information about the MBMS network may be transmitted to the second base station by using a new message.

The information about the MBMS network may be the information about the MBMS network to which the first base station belongs. The information about the MBMS network may include the USD of the MBMS network to which the first base station belongs. The information about the MBMS network may be the information used for MBMS reception of V2X message in the MBMS network to which the first base station belongs. The MBMS network may be a local MBMS network.

At the S1020 step, if the second base station receives information about an MBMS network from the first base station, the second base station may compare the information about the MBMS network stored in the second base station with the information about the MBMS network received from the first base station.

If the information about the MBMS network received from the first base station matches any one of the information about an MBMS network stored in the second base station, the second base station may ignore the information about the MBMS network received from the first base station. If the information about the MBMS network received from the first base station is different from the information about the MBMS network stored in the second base station, the second base station may store the information about the MBMS network received from the first base station. And the second base station may respond with an eNB configuration update acknowledge message or a new message.

The information about the MBMS network stored in the second base station may be the information about an MBMS network to which the second base station belongs. In addition, the information about the MBMS network stored in the second base station may be the information about an MBMS network to which a neighboring base station of the second base station belongs.

The information about the MBMS network stored in the second base station may include the USD of an MBMS network to which the second base station belongs. In addition, the information about the MBMS network stored in the second base station may further include the USD of the MBMS network to which a neighboring base station of the second base station belongs.

The information about the MBMS network stored in the second base station may be the information used for MBMS reception of V2X message in the MBMS network to which the second base station belongs. In addition, the information about the MBMS network stored in the second base station may be the information used for MBMS reception of V2X message in the MBMS network to which a neighboring base station of the second base station belongs.

According to the proposed procedure, a base station may know the information about an MBMS network to which a neighboring base station belongs. Therefore, even if the UE moves from a current MBMS network to a different MBMS network, the UE may receive the V2X message broadcast by the different MBMS network without a delay.

Figure 11:
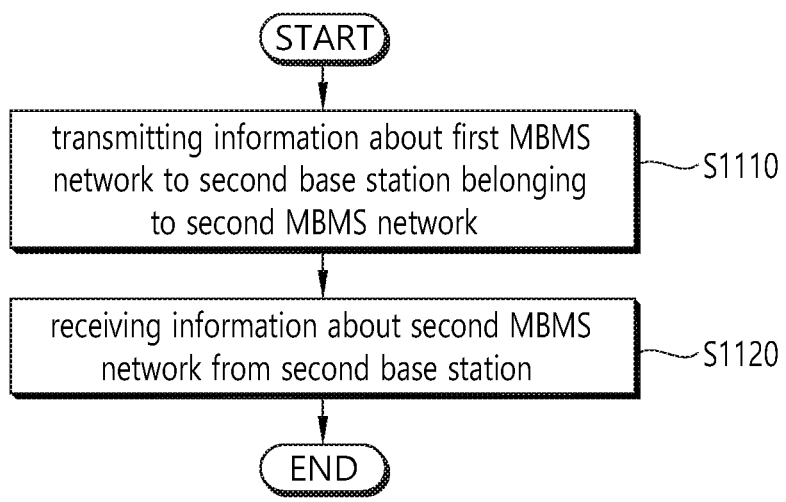
FIG. 11 is a block diagram illustrating a method for performing V2X communication by a base station belonging to an MBMS network according to one embodiment of the present invention.

FIG. 11 is a block diagram illustrating a method for performing V2X communication by a base station belonging to an MBMS network according to one embodiment of the present invention.

Referring to FIG. 11, at the S1110 step, the first base station belonging to a first MBMS network may transmit information about the first MBMS network to the second base station belonging to a second MBMS network.

At the S1120 step, the first base station belonging to the first MBMS network may receive the information about the second MBMS network from the second base station.

The first MBMS network and the second MBMS network may be MBMS networks having different network information. The first MBMS network and the second MBMS network may be local MBMS networks different from each other.

Information about the first MBMS network may include User Service Description (USD) of the first MBMS network, and information about the second MBMS network may include USD of the second MBMS network. Information about the first MBMS network may be used for MBMS reception of V2X message in the first MBMS network, and information about the second MBMS network may be used for MBMS reception of V2X message in the second MBMS network.

Information about the first MBMS network may be transmitted to the second base station by being included in an X2 setup request message, and information about the second MBMS network may be received from the second base station by being included in an X2 setup response message.

Figure 12:
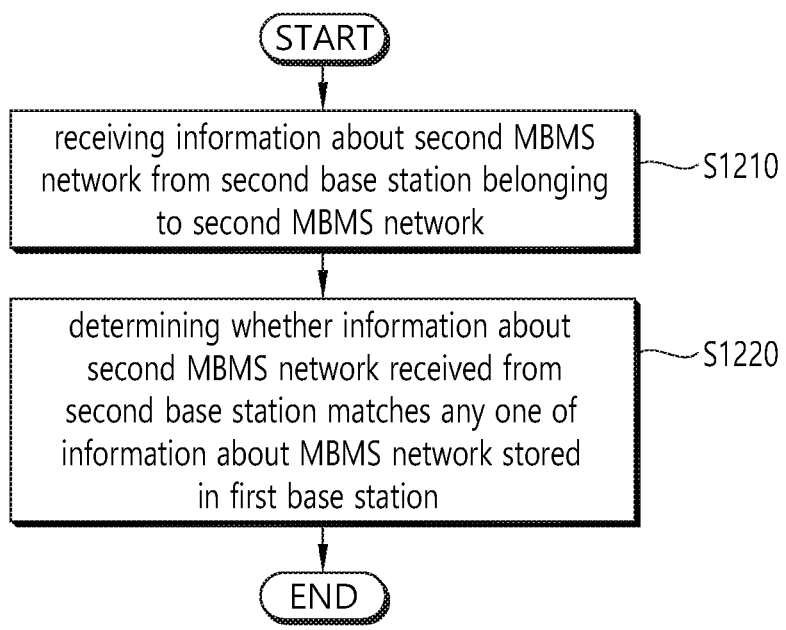
FIG. 12 is a block diagram illustrating a method for performing V2X communication by a base station belonging to an MBMS network according to one embodiment of the present invention.

FIG. 12 is a block diagram illustrating a method for performing V2X communication by a base station belonging to an MBMS network according to one embodiment of the present invention.

Referring to FIG. 12, at the S1210 step, the first base station belonging to a first MBMS network may receive information about a second MBMS network from the second base station belonging to the second MBMS network.

At the S1220 step, the first base station belonging to the first MBMS network may determine whether the information about the second MBMS network received from the second base station matches any one of the information about an MBMS network stored in the first base station.

If it is determined that the information about the second MBMS network received from the second base station does not match the information about the MBMS network stored in the first base station, the first base station belonging to the first MBMS network may store the received information about the second MBMS network. On the other hand, if it is determined that the information about the second MBMS network received from the second base station matches any one of the information about an MBMS network stored in the first base station, the first base station belonging to the first MBMS network may ignore the received information about the second MBMS network.

The first MBMS network and the second MBMS network may be MBMS networks having different network information. The first MBMS network and the second MBMS network may be local MBMS networks different from each other.

Information about the second MBMS network may include User Service Description (USD) of the second MBMS network.

The first base station belonging to the first MBMS network may transmit a response to the information about the second MBMS network to the second base station. The information about the second MBMS network may be received from the second base station by being included in an eNB configuration update message, and a response to the information about the second MBMS network may be transmitted to the second base station by being included in an eNB configuration update acknowledge message.

Figure 13:
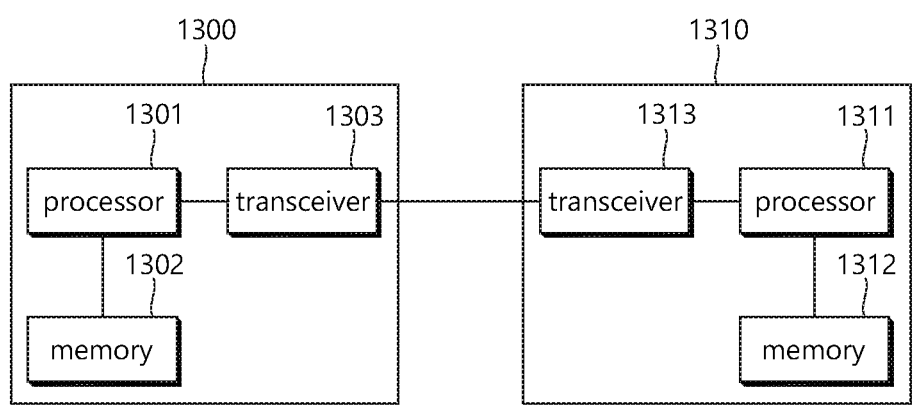
FIG. 13 is a block diagram illustrating a wireless communication system according to the embodiment of the present invention.

FIG. 13 is a block diagram illustrating a wireless communication system according to the embodiment of the present invention.

A first BS 1300 includes a processor 1301, a memory 1302 and a transceiver 1303. The memory 1302 is connected to the processor 1301, and stores various information for driving the processor 1301. The transceiver 1303 is connected to the processor 1301, and transmits and/or receives radio signals. The processor 1301 implements proposed functions, processes and/or methods. In the above embodiment, an operation of the first BS may be implemented by the processor 1301.

A second BS 1310 includes a processor 1311, a memory 1312 and a transceiver 1313. The memory 1312 is connected to the processor 1311, and stores various information for driving the processor 1311. The transceiver 1313 is connected to the processor 1311, and transmits and/or receives radio signals. The processor 1311 implements proposed functions, processes and/or methods. In the above embodiment, an operation of the second BS may be implemented by the processor 1311.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for performing vehicle-to-everything (V2X) communication by a first base station belonging to a first multimedia broadcast multicast service (MBMS) network in a wireless communication system, the method comprising:
   transmitting information related to the first MBMS network, which includes a user service description (USD) of the first MBMS network, to a second base station belonging to a second MBMS network; and
   receiving information related to the second MBMS network, which includes a USD of the second MBMS network, from the second base station,
   wherein the information related to the first MBMS network is used for MBMS reception of V2X message in the first MBMS network, and wherein the information related to the second MBMS network is used for MBMS reception of V2X message in the second MBMS network.

2. The method of claim 1, wherein the first MBMS network and the second MBMS network are MBMS networks having different network information.

3. The method of claim 2, wherein the first MBMS network and the second MBMS network are local MBMS networks different from each other.

4. The method of claim 1,
wherein the information related to the first MBMS network is transmitted to the second base station by being included in an X2 setup request message, and
wherein the information related to the second MBMS network is received from the second base station by being included in an X2 setup response message.

5. A method for performing vehicle-to-everything (V2X) communication by a first base station belonging to a first multimedia broadcast multicast service (MBMS) network in a wireless communication system, the method comprising:
receiving an eNB configuration update message including information related to a second MBMS network from a second base station belonging to the second MBMS network;
determining whether the information related to the second MBMS network received from the second base station matches any one of information related to an MBMS network stored in the first base station; and
transmitting an eNB configuration update acknowledge message including a response to the information related to the second MBMS network, to the second base station,
wherein the information related to the second MBMS network is received from the second base station by being included in an eNB configuration update message, and the information related to the second MBMS network is transmitted to the second base station by being included in an eNB configuration update acknowledge message.

6. The method of claim 5, further comprising,
based on the determining that the information related to the second MBMS network received from the second base station does not match the information related to the MBMS network stored in the first base station, storing the received information related to the second MBMS network.

7. The method of claim 5, further comprising,
based on the determining that the information related to the second MBMS network received from the second base station matches any one of the information related to the MBMS network stored in the first base station, ignoring the received information related to the second MBMS network.

8. The method of claim 5, wherein the first MBMS network and the second MBMS network are MBMS networks having different network information.

9. The method of claim 8, wherein the first MBMS network and the second MBMS network are local MBMS networks different from each other.

10. The method of claim 5, wherein the information related to the second MBMS network includes a user service description (USD) of the second MBMS network.

11. A first base station belonging to a first multimedia broadcast multicast service (MBMS) network performing vehicle-to-everything (V2X) communication in a wireless communication system, the first base station comprising:
a memory;
a transceiver; and
a processor connecting the memory and the transceiver, wherein the processor is configured to:
control the transceiver to transmit information related to the first MBMS network, which includes a user service description (USD) of the first MBMS network, to a second base station belonging to a second MBMS network; and
control the transceiver to receive information related to the second MBMS network, which includes a USD of the second MBMS network, from the second base station,
wherein the information related to the first MBMS network is used for MBMS reception of V2X message in the first MBMS network, and
wherein the information related to the second MBMS network is used for MBMS reception of V2X message in the second MBMS network.

* * * * *